United States Patent

[11] 3,593,102

| [72] | Inventors | Yoshichi Kawashima<br>Gifu-shi;<br>Hisami Mitsueda, Mie-gun, Mie-ken, both of, Japan |
|---|---|---|
| [21] | Appl. No. | 822,952 |
| [22] | Filed | May 8, 1969 |
| [45] | Patented | July 13, 1971 |
| [73] | Assignee | Nippon Denso Company Limited<br>Kariya-shi, Japan |
| [32] | Priority | May 16, 1968, May 21, 1968 |
| [33] |  | Japan |
| [31] |  | 43/33081 and 43/34199 |

[54] SEMICONDUCTOR VOLTAGE REGULATOR
10 Claims, 4 Drawing Figs.

[52] U.S. Cl. .................................................. 320/64,
320/68, 322/28, 322/60, 322/73, 322/99
[51] Int. Cl. ............................................................ H02j 7/18
[50] Field of Search ............................................ 322/28, 60,
73, 99, 45, 75, 76, 79, 83, 84, 85; 320/61, 62, 64, 67, 68, 71, 48

[56] References Cited
UNITED STATES PATENTS

| 2,912,594 | 11/1959 | Raver | 320/48 |
| 3,364,416 | 1/1968 | Kirk et al. | 322/73 |
| 3,456,182 | 7/1969 | Cummins et al. | 322/28 |
| 3,469,168 | 9/1969 | Harland, Jr. et al. | 320/64 |
| 3,470,456 | 9/1969 | Reinert | 322/28 |
| 3,488,560 | 1/1970 | Konopa | 322/28 |
| 3,492,559 | 1/1970 | Harris | 320/48 |
| 3,496,443 | 2/1970 | Snedeker et al. | 320/68 |

*Primary Examiner*—J. D. Miller
*Assistant Examiner*—John M. Gunther
*Attorney*—Cushman, Darby & Cushman

ABSTRACT: A semiconductor voltage regulator for storage battery charging means having a full-wave rectifying circuit, wherein the regulator includes an AC generator rotation detecting element connected to the half-wave rectifying ends of the full-wave rectifying circuit, a field current control transistor circuit, and an auxiliary full-wave rectifying circuit for controlling through another control circuit the flashing of a charge indication lamp and the initial exciting current of a field winding.

INVENTORS
Yoshichi Kawashima
Hisami Mitsueda

BY Cushman, Darby & Cushman
ATTORNEYS

INVENTORS
Yoshichi Kawashima
Hisami Mitsueda

BY Cushman, Darby & Cushman
ATTORNEYS

SEMICONDUCTOR VOLTAGE REGULATOR

BACKGROUND OF THE INVENTION

1. Field of the Invention

The present invention relates in general to a semiconductor voltage regulator for storage battery charging means and particularly to those for maintaining the terminal voltage of a storage battery at a predetermined value by interrupting the field current of an AC generator for charging the storage battery using a field winding current control transistor circuit which detects the terminal voltage of the storage battery with a Zener diode and performs a switching operation.

2. Description of the Prior Art

The conventional means of this sort will be explained referring to FIG. 1. A three-phase full-wave rectifying circuit 4 and another three-phase full-wave rectifying circuit 4' which includes a part of the three-phase full-wave rectifying circuit 4 and three diodes 4'a, 4'b and 4'c for flashing a charge indication lamp are connected to the output end of a three-phase AC generator 2. When the three-phase AC generator 2 is in an inoperative state, the current which flows through the diodes 4'a, 4'b and 4'c is zero. If a key switch 26 for starting an internal combustion engine is closed, a field current control transistor circuit 10 will operate as follows. Namely, if the three-phase AC generator 2 is in an inoperative state, even though the key switch 26 is closed, a terminal voltage of a storage battery 1 does not reach a value sufficient to make conductive a Zener diode 11 for detecting the terminal voltage which is connected to the base of a transistor 14, and then the transistor 14 remains in a cutoff state without the base current. So, a field current control transistor 15 is supplied with a base current from the storage battery 1 through a resistor 13 and becomes conductive. At the same time, a transistor 16 which is in Darlington connection with the transistor 15 becomes also conductive. Consequently, a flashing circuit from the positive pole of the storage battery 1, through the key switch 26, a parallel circuit of a resistor 25 and a charge indication lamp 24, a field winding 3 and the field current control transistor 16, to the negative pole of the storage battery 1 is accomplished and the charge indication lamp 24, is lighting to indicate that the three-phase AC generator 2 is nongenerating, namely, the storage battery 1 is not charged from the generator 2. Further, the resistance component of the parallel circuit of the resistor 25 and the charge indication lamp 24 limits an initial exciting current which flows in the field winding 3 from the storage battery 1 in the nongenerating state of the three-phase AC generator 2 to a small value and thereby not only the excess field current is prevented from flowing through the field winding 3.

However, in the conventional device, when the three-phase AC generator 2 starts to generate, and a large current flows to the field winding 3 from the output ends of the three-phase AC generator through a three-phase full-wave rectifying circuit 4' so that the diodes 4'a, 4'b and 4'c must be required to be such that have large current capacity, and, therefore, not only all the dimensions of the voltage regulating means become large but also the power dissipation in the diodes 4'a, 4'b and 4'c becomes large, and further when the three-phase AC generator 2 is in the nongenerating state with the key switch 26 being closed, the initial exciting circuit of the field winding 3 and the circuit for flashing the charge indication lamp 24 are accomplished through the field current control transistor 16, so that there is the disadvantage of useless power dissipation in the transistor 16 in the nongenerating state of the three-phase AC generator 2.

Further, if the connection between dividing resistors 36 and 37 and the positive pole of the storage battery 1 becomes open when a wire is disconnected accidentally, etc., the transistor 14 is not supplied with the base current without regard to the terminal voltage of the storage battery 1. Thereby, the transistor 14 will remain in the cutoff state after the wire is disconnected accidentally and the field current control transistors 15 and 16 will remain in the conductive state after the wire is disconnected accidentally. Then, the current keeps on flowing through the field winding 3 of the three-phase AC generator 2 so that the generated voltage of the generator 2 cannot be controlled, and consequently an excess charge of the storage battery 1 and moreover an accident, such as burning of electric components which form the voltage regulating means or an electrical load of the storage battery, will occur, and if the connection between a point A, the positive side of the three-phase full-wave rectifying circuit 4, and the positive pole of the storage battery 1 becomes open as a result of an accidental disconnection or blowing of a wire, not only charging the storage battery 1 cannot be accomplished but also the generated voltage of the three-phase AC generator 2 cannot be controlled, resulting in the disadvantage of burning the voltage regulating means and the electric components.

SUMMARY OF THE INVENTION

An object of the present invention is to provide a voltage regulator for storage battery charging means having a full-wave rectifying circuit connected to the output ends of an AC generator for charging a storage battery, including a detecting element for detecting the rotation of the generator connected to half-wave rectifying ends of the full-wave rectifying circuit, a field current control transistor circuit and an auxiliary full-wave rectifying circuit which includes a part of the AC generator and detects the existence of a charging current from the AC generator.

Another object of the present invention is to provide a voltage regulator for storage battery charging means having a full-wave rectifying circuit connected to the output end of an AC generator for charging a storage battery, wherein a detecting element for detecting the rotation of the generator is connected to half-wave rectifying ends of the full-wave rectifying circuit, a field current control transistor circuit for the AC generator is formed so as to be operative in response to the output voltage of the detecting element for detecting the rotation of the generator as an operating voltage, an auxiliary full-wave rectifying circuit which includes a part of the full-wave rectifying circuit is formed so as to detect the existence of a charging current from the AC generator, a control circuit for flashing a charge indication lamp which is activated by the output of the rectifying circuit is formed to be in parallel with the field current control transistor circuit in association with a field winding of the AC generator and by the output of the control circuit for flashing the charge indication lamp the control for flashing the charge indication lamp is accomplished and an initial exciting current is supplied to the field winding.

Another object of the present invention is to provide a voltage regulator for storage battery charging means having a full-wave rectifying circuit connected to the output end of an AC generator for charging a storage battery, wherein a detecting circuit for detecting the rotation of the generator is connected to half-wave rectifying ends of the full-wave rectifying circuit, there is a transistor circuit which forces a field current control transistor circuit in a field current control circuit into a cutoff state by detecting the output voltage of the detecting circuit, a diode is inserted between a Zener diode in the field current control circuit and the storage battery in the direction where a current can flow from the storage battery to the Zener diode, a resistor is inserted between the Zener diode and the output end of the full-wave rectifying circuit, an auxiliary full-wave rectifying circuit which includes a part of the full-wave rectifying circuit so as to detect the existence of a charging current from the AC generator, there is a control circuit for controlling a charge indication lamp which includes transistors forming a circuit for flashing the charge indication lamp and an initial exciting circuit by the output of the rectifying circuit, and diodes for preventing a current from flowing reversely are inserted in the circuit for flashing the charge indication lamp circuit and the initial exciting circuit.

According to the present invention, when the AC generator is in a nongenerating state, an initial exciting current can flow through the field winding by the control circuit for flashing the charge indication lamp without activating the field current control transistors in the field current control transistor circuit, so that the excellent effect is obtained that the generation of heat in the field current control transistors in the nongenerating state of the AC generator which was troublesome in the conventional means can be avoided.

Further, according to the present invention, a plurality of diodes having large current capacity for controlling the charge indication lamp which causes to make all the dimensions of the means large in the conventional means can be eliminated, these can be replaced by transistors, diodes, etc. with small power capacity to accomplish the operation thereof so that all the dimensions of the means can be small, and consequently the excellent effect is obtained that the means can be realized in an integrated circuit with ease thereby.

Further, according to the present invention, even if the connection between the output end of the full-wave rectifying circuit and the storage battery becomes open by an accident, such as a wire disconnection, the generated voltage of the AC generator can be controlled by detecting with the Zener diode the voltage at the output end using a voltage drop of the resistor and regarding the voltage as the terminal voltage of the storage battery which can be obtained when the circuit connection is normal. And, even if the connection between the Zener diode and the storage battery becomes open by accident, such as a wire disconnection, the storage battery can be charged, and moreover the terminal voltage of the storage battery can be controlled to have the predetermined value by detecting with the Zener diode the terminal voltage of the storage battery using the voltage drop of the resistor and regarding the terminal voltage as the terminal voltage of the storage battery which can be obtained when the circuit connection is normal, and consequently the excellent effect is obtained that overcharge of the storage battery and burning of the voltage regulator and the other electric components can be avoided.

Further, according to the present invention, when the key switch is closed and the AC generator does not generate, not only the charge indication lamp is lighting exactly according to the existence of a charging current from the AC generator but also an initial exciting operation can be accomplished without activating the field current control transistors into the conductive state by the operation of the transistor circuit, so that power dissipation in the transistors in the nongenerating state of the AC generator can be avoided.

Further, according to the present invention, diodes and the base-emitter junction of a transistor which are circuit elements in the auxiliary full-wave rectifying circuit have the same temperature characteristics, the excellent effect is obtained that the lighting of a charge indication lamp can be controlled with a constant voltage irrespective of the surrounding temperature.

Further, according to the present invention, the diodes for preventing a current from flowing reversely are inserted in the flashing circuit and the initial exciting circuit, and therefore, the excellent effects are obtained that the disadvantage that the transistor becomes conductive while the key switch is closed so that the useless initial exciting current flows can be avoided and the useless generation of heat in circuit elements in the initial exciting circuit into which a current flows reversely by the cutoff of the transistor while the key switch is closed can also be avoided.

DESCRIPTION OF THE PREFERRED EMBODIMENTS

Figure 1:
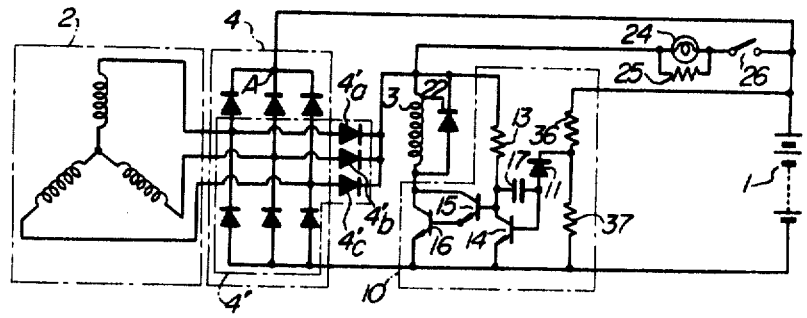
FIG. 1 is an electrical wiring diagram of a conventional voltage regulator.
Figure 2:
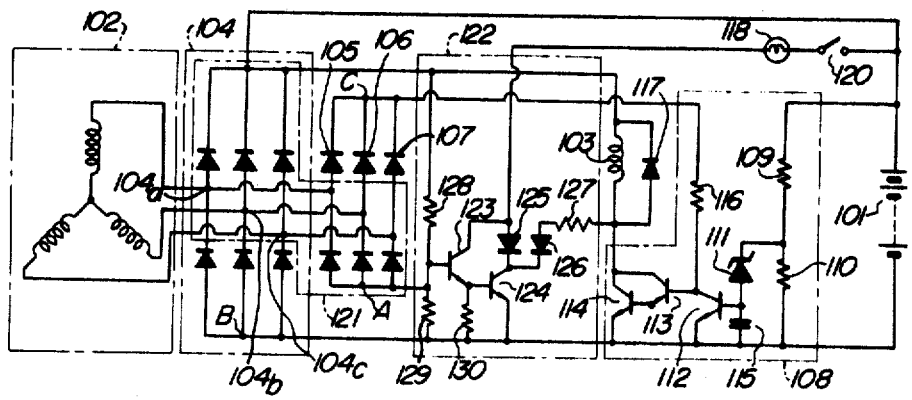
FIG. 2 is an electrical wiring diagram of a voltage regulator in accordance with an embodiment of the present invention.

First, the present invention will be explained referring to a first embodiment shown in FIG. 2. In FIG. 2, numeral 101 designates a storage battery and 102 a three-phase AC generator which is driven by an internal combustion engine used in a vehicle, etc. Numeral 103 designates a field winding of the generator 102, 104 a three-phase full-wave rectifying circuit which is connected to the output end of the three-phase AC generator 102, and 104a, 104b and 104c half-wave rectifying ends of the rectifying circuit 104. A storage battery charging means consists of the three-phase AC generator 102 and the three-phase full-wave rectifying circuit 104. Numerals 105, 106 and 107 designate diodes for detecting the rotation of the generator and negative pole end of respective diodes 105, 106 and 107 are connected to half-wave rectifying ends 104a, 104b and 104c of the three-phase full-wave rectifying circuit 104, respectively. Numeral 108 designates a field current control transistor circuit which operates in response to the output of the diodes 105, 106 and 107. Numerals 109 and 110 designate dividing resistors, and 111 a Zener diode to detect the terminal voltage of a storage battery 101. Numeral 112 designates a voltage detection transistor, and 113 and 114 field current control transistors which are in Darlington connection with each other and accomplish a switching operation with the voltage detection transistor, etc. Numeral 115 designates a relatively high frequency bypass condenser and 116 a resistor which operates not only as the load resistor of the voltage detection transistor 112 but also as the base resistor of the field current control transistor 113. Numeral 117 designates a diode which absorbs the counterelectromotive force generated in the field winding 103, 118 a charge indication lamp and 120 a key switch for starting an internal combustion engine. Numeral 121 designates an auxiliary three-phase full-wave rectifying circuit which includes a part of the three-phase full-wave rectifying circuit 104 and detects the existence of the charging current from the three-phase AC transistor 112 to the storage battery 101. Numeral 122 designates a control circuit for flashing the charge indication lamp 118 which is formed to be parallel to the field current control transistor circuit 108 in association with the field winding 103. Numerals 123 and 124 designate transistors, 125 and 126 diodes, and the cathode thereof are connected to the collector of the transistor 124 and the anode of the diode 125 and the anodes of the diode 126 are connected to the collector of the transistor 123 and the generator side end of the field winding 103 through an initial exciting resistor 127, respectively. Numerals 128, 129 and 130 designate biasing resistors.

Next, the operation of the device constituted as mentioned above according to the present invention will be explained. When the key switch 120 is not closed and the three-phase AC generator 102 is in the nongenerating state, there is no current flowing through the diodes 105, 106 and 107 so that the field current control transistor 113 is not supplied with the base current, and then the transistor 113 is in the cutoff state and the field current control transistor 114 which is in Darlington connection with the transistor 113 is also in the cutoff state. On the other hand, the transistor 123 is supplied with the base current from the storage battery through the resistor but the key switch 120 is in an open state so that the supplied collector voltage of the transistor 123 is zero volt then the transistor 123 is in the cutoff state. At the same time, the terminal voltage of the resistor 130 which is connected to the emitter of the transistor 123 is nearly zero, so that the transistor 124 is also in the cutoff state. By this operation, an initial exciting current circuit for the field winding 103 cannot be accomplished, and therefore no initial exciting current flows through the field winding 103. In this case, a current which flows from the storage battery 101 into the collector of the transistor 123 through the field winding 103, the resistor 127 and the diode 126 is interrupted by the diode 125. Next, when the key switch 120 is closed, if the three-phase AC generator 102 is in the nongenerating state, the field current control transistors 113 and 114 remain in the cutoff state. On the other hand, when the transistor 123 is supplied with the collector voltage from the storage battery 101 through the key switch 120, and the charge indication lamp 118 then the transistor 123 becomes conductive. As a result, the transistor 124 is biased in the forward direction by the terminal voltage of the resistor 130 which is connected to the emitter of the transistor 123 and becomes conductive. Thereby, the flashing circuit for the charge indication lamp 118 from the storage battery 101 to the negative pole of the storage battery through the key switch 120, the switch 120, the charge indication lamp 118, diode 125 and transistor 124 is accomplished, and the charge indication lamp 118 is lighting to indicate that the storage battery 101 is charged and at the same time the circuit for the initial exciting current from the positive pole of the storage battery 101 to the negative pole of the storage battery 101 through the field winding 103, the resistor 127, the diode 126 and the transistor 124 is accomplished with a result that the field winding 103 accomplishes the initial exciting operation. Then, the heat in the field current control transistors 113 and 114 is not generated while the three-phase AC generator 102 is in the nongenerating state. Next, when the three-phase AC generator 102 begins to generate, the base current of the field current control transistor 113 flows through the diodes 105, 106 and 107 and the resistor 116, and therefore the transistor 113 becomes conductive along with the transistor 114. Further, when the generated voltage of the three-phase AC generator 102 increases and the storage battery 101 begins to be charged through the three-phase full-wave rectifying circuit 104, the voltage at the A point which is at the negative side of the auxiliary three-phase full-wave rectifying circuit 121 and the voltage of which is the base voltage of the transistor 123 becomes nearly zero volt as well as the voltage at the point B which is at the negative side of the three-phase full-wave rectifying circuit 104. Thereby, the transistor 123 becomes in the cutoff state with the transistor 124, and at the same time, the charge indication lamp 118 turns off and no current flows through the initial exciting resistor 127. Here, the diode 126 operates so as to prevent an erroneous operation, wherein the flashing circuit for the charge indication lamp 118 from the positive pole of the storage battery 101 to the negative pole of the storage battery 101 through the key switch 120, the charge indication lamp 118, the diode 125, the resistor 127 and the transistor 114 is accomplished to flash the charge indication lamp 118, when the field current control transistor 114 is conductive and the storage battery 101 is charged. At the same time when the three-phase AC generator 102 begins to generate, the voltage detection transistor 112 begins to operate in response to the voltage at the junction point C of the diodes 105, 106 and 107, the terminal voltage of the storage battery 101 is detected with the dividing resistors 109 and 110 and the Zener diode 111, and the transistor 112 and the field current control transistors 113 and 114 accomplish a switching operation to interrupt the field current in order to maintain the output voltage of the three-phase AC generator 102, namely, the terminal voltage of the storage battery 101 at the predetermined value.

Figure 3:
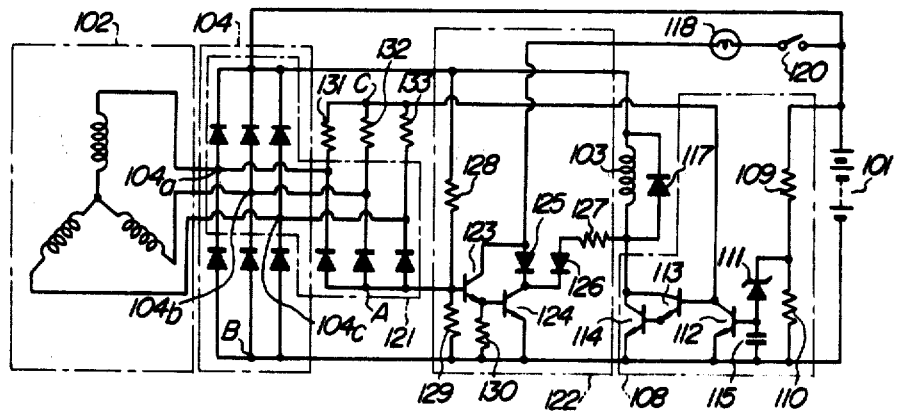
FIG. 3 is an electrical wiring diagram of a voltage regulator in accordance with another embodiment of the present invention.

Next, FIG. 3 shows a second embodiment according to the present invention and, comparing with the first embodiment, not only the resistor 116 is eliminated but also the diodes 105, 106 and 107 which operate as detecting elements for the rotation of the generation are replaced by resistors 131, 132 and 133 as shown in FIG. 3, which can accomplish the same operations as those of the diodes 105, 106 and 107. In FIG. 3, similar parts are denoted by the same reference numerals as those used in FIG. 2.

Further, the three-phase AC generator 102 is used as storage battery charging means in the first and the second embodiments, however, the three-phase AC generator can be replaced by the other multiphase AC generator and in the case of replacement by a one-phase AC generator if a diode is used as a detecting element for the rotation of the generator, an operating voltage with relatively a little ripples can be applied to the field current control transistor circuit, and then the same operations as those of the embodiment mentioned above can be accomplished.

Figure 4:
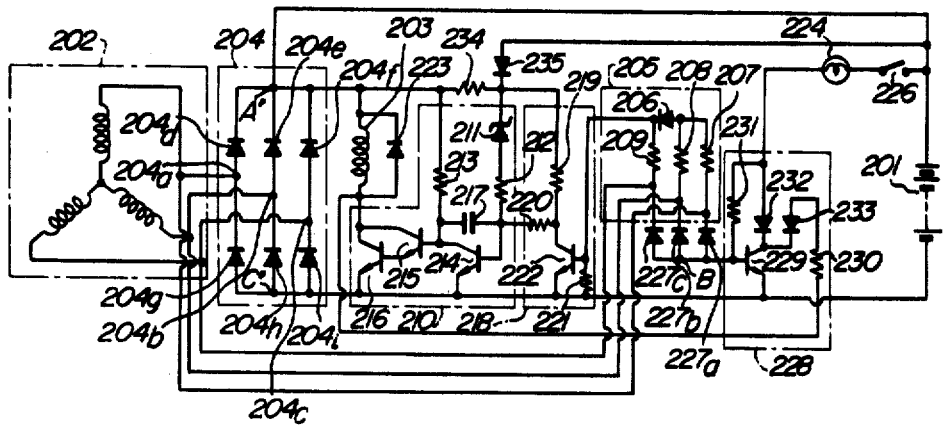
FIG. 4 is an electrical wiring diagram of a voltage regulator in accordance with still another embodiment of the present invention.

Next, the present invention will be explained referring to a third embodiment as shown in FIG. 4. In FIG. 4, numeral 201 designates a storage battery and 202 a three-phase AC generator which is driven by an internal combustion engine in a vehicle. Numeral 203 designates a field winding of the three-phase AC generator 202, and 204 a three-phase full-wave rectifying circuit connected to the output end of the three-phase AC generator, in which 204a, 204b and 204c designate half-wave rectifying ends and 204d, 204e, 204f, 204g, 204h and 204i diodes forming the circuit element. Storage battery charging means consists of the three-phase AC generator 202 and the three-phase full-wave rectifying circuit 204. Numeral 205 designates a detecting circuit for detecting the rotation of the generator, 206 a diode for preventing a current from flowing reversely and 207, 208 and 209 resistors, one ends of which resistors are connected to the half-wave rectifying ends 204a, 204b and 204c, respectively. Numeral 210 designates a field current control circuit, 211 a Zener diode which detects the terminal voltage of the storage battery 201, 212 and 213 resistors, 214 a transistor, 215 and 216 field current control transistors, 217 a relatively high frequency bypass condenser, 218 a transistor circuit, 219, 220 and 221 resistors, and 222 a transistor. Numeral 223 designates a diode to absorb the counter electromotive force generated in the field winding 203. Numeral 224 designates a charge indication lamp, and 226 a key switch which operates also as a switch for starting the internal combustion engine driving the three-phase AC generator 202. Numerals 227a, 227b and 227c designate diodes which form an auxiliary three-phase full-wave rectifying circuit together with the diodes 204d, 204e and 204f in the three-phase full-wave rectifying circuit 204 and detect the existence of the charging current from the full-wave AC generator 202 to the storage battery 201. Numeral 228 designates a control circuit for flashing the charge indication lamp 224 which is parallel to the field current control circuit 210 in association with the field winding 203. Numeral 229 designates a transistor, 230 and 231 resistors, 232 and 233 diodes for preventing a current from flowing reversely, the cathodes of these diodes are connected together to the collector of the transistor 229 and the anode of the diode 232 and the anode of the diode 233 are connected to a junction point of the charge indication lamp 224 and one end of the field winding 203 through the resistor 230, respectively. Numeral 234 designates a resistor which is inserted between a point A, namely, the positive side of the output end of the three-phase AC generator and the Zener diode 211. Numeral 235 designates a diode which is inserted between the Zener diode 211 and the storage battery 201 in the direction where a current flows from the storage battery 201 to the Zener diode 211.

Next, the operation of the device constituted as mentioned above according to a third embodiment of the present invention will be explained. When the key switch 226 is not closed and the three-phase AC generator 202 is in the nongenerating state, there is no current flowing through the resistors 207, 208 and 209 so that the transistor 222 is not supplied with a base current with the transistor 222 being in the cutoff state. On the other hand, the transistor 214 is supplied with a base current from the storage battery 201 through the diode 235 and the resistors 219 and 220, then the transistor 214 is conductive. Consequently, the field current control transistors 215 and 216 which are in Darlington connection with each other are in the cutoff state so that there is no power dissipation in the transistors 215 and 216 while the three-phase AC generator is in the nongenerating state. Next, when the three-phase AC generator 202 is in the nongenerating state, even if the key switch 226 is closed, the transistor 229 is supplied with a base current from the storage battery 201 through the resistor 231 so that the transistor 229 is in the conductive state. Then, the flashing circuit for the charge indication lamp 224, from the positive electrode of the storage battery 201 to the negative electrode of the storage battery through the key switch 226, the charge indication lamp 224, the diode 232 and the transistor 229, is formed so that the charge indication lamp becomes lighted to indicate that the three-phase AC generator 202 is in the nongenerating state, namely, the storage battery is not charging. And, at the same time, the initial exciting circuit, from the positive electrode of the storage battery 201 to the negative electrode of the storage battery 201 through the field winding 203, the resistor 230, the diode 233 for preventing a current from flowing reversely and the transistor 229, is formed. At this time, the initial exciting current which flows through the exciting circuit is limited to a small value by the resistor 230. And if the generated voltage of the three-phase AC generator 202 increases by being excited by the small exciting current and reaches 1 volt, the transistor 222, the voltage of which is required to make the junction between the base and the emitter conductive is about 1 volt, becomes conductive, the transistor 214 becomes cutoff and the field current control transistors 215 and 216 become conductive. Thereby, a large exciting current is supplied to the field winding 230 of the three-phase AC generator 202 with a result that the generated voltage increases gradually by the self-exciting effect. Namely, the initial exciting current can be a small value, and the power dissipation in the resistor 230 becomes very small. Further, the diode 206 accomplishes the operation to make the one-phase current of the three AC generator 202 which flows through the resistor 209 flows into the base of the transistor 222 surely. Consequently, the transistor 222 can detect the small generated voltage of the three-phase AC generator 202 surely. And, when the three-phase AC generator 202 begins to generate, the transistor 222 remains conductive and if the generated voltage of the generator 202 increases and reaches a value which enables to charge the storage battery 201, the base voltage of the transistor 229 or the voltage at the point B', namely, the cathode sides of the diodes 227a, 227b and 227c which form the auxiliary three-phase full-wave rectifying circuit, becomes equal to the voltage at the point c', the negative side of the three-phase full-wave rectifying circuit 204, that is, nearly zero volt. Thereby, the transistor 229 becomes in the cutoff state and the charge indication lamp 224 turns off soon and at the same time no current flows through the resistor 230 in the initial exciting circuit. After this, the terminal voltage of the storage battery 201 is detected by the Zener diode 211 and the switching operation to interrupt flow the field current with the transistor 214 and the field current control transistors 215 and 216 in order to maintain the terminal voltage of the storage battery at the predetermined value. The diode 232 for preventing a current from flowing reversely accomplishes the operation to prevent the base current of the transistor 229 from flowing from the positive pole of the storage battery 201 to the base of the transistor 229 through the resistor field winding 3, the resistor 230 and the diode 233 for preventing a current from flowing reversely while the key switch is open and the diode 233 for preventing a current from flowing reversely accomplishes the operation to prevent a current from flowing through the storage battery 201 to the collector of the field current control transistor 216 through the key switch 226, the resistor the charge indication lamp 224, the diode 232 for preventing a current from flowing reversely and the resistor 230 while the key switch is closed and the transistor 229 is cutoff.

Further, if the connection between the positive side point A' which is the output end of the three-phase full-wave rectifying circuit 204 and the positive electrode of the storage battery 201 becomes open by accident, such as disconnection of a wire, etc., the storage battery 201 cannot be charged through the rectifying circuit 204. However, the generated voltage of the three-phase AC generator 202 can be controlled by the switching operation of the transistor 214 and the field current control transistors 215 and 216 to interrupt the field current, that can be accomplished by detecting the voltage of the output end of the rectifying circuit 204 using the voltage drop of the resistor 234 with the Zener diode 211 and regarding the voltage as the terminal voltage of the storage battery 201 when the circuit connections are normal. Further, even if the connection between the cathode of the Zener diode 211 and the storage battery 201 becomes open by accident, such as disconnection of a wire, blowing of a fuse, etc., the storage battery 201 can be charged and moreover the terminal voltage of the storage battery 201 can be controlled to be maintained at the predetermined value by the switching operation of the transistor 214 and the field current control transistors 215 and 216 to interrupt and flow the field current, by detecting the voltage of the terminal voltage of the storage battery 201 at the occurrence of the accidence using the voltage drop of the resistor 234 with the Zener diode 211 and regarding the voltage as the terminal voltage of the storage battery 201 when the circuit connections are normal.

In the third embodiment mentioned above, the diode for preventing a current from flowing reversely 206 and the resistors 207, 208 and 209 are used in the detecting circuit for the rotation of the generator 205, however, without the diode 206 the initial exciting current can flow by driving the transistor 222 using a combination current of each phase current obtained through the resistors 207, 208 and 209. Further, if the diode 206 is eliminated and the resistors 207, 208 and 209 are replaced by diodes to form the detecting circuit for detecting the rotation of the generator 205, the same operation as that of the detecting circuit for detecting the rotation of the generator 205 in the third embodiment can be accomplished. Further, in the third embodiment the three-phase AC generator 202 is used as storage battery charging means, however, the three-phase AC generator 202 can be replaced by the other multiphase AC generator and in the case of replacement by a one-phase AC generator if a diode is used to form the detecting circuit for the rotation of the generator, the transistor 222 can be activated by an operating voltage with rather a little ripples, and then the same operations as those of the third embodiment can be accomplished.

We claim:

1. A semiconductor voltage regulator for use with storage battery charging means including a full-wave rectifying circuit connected to the output end of an AC generator for charging said storage battery, said regulator comprising:
   detecting means connected to said full wave rectifying circuit for detecting the rotation of said generator,
   field control transistor circuit means connected to said detecting means and to a field coil of said generator for controllably completing a main controlled exciting current path through said field coil only if said detecting means has sensed rotation of said generator,
   an auxiliary full-wave rectifying circuit which includes a part of said full-wave rectifying circuit for detecting the existence of a charging current from said generator, and
   a control circuit means connected to said auxiliary rectifying circuit and to said field coil for controlling a charge indication lamp and for controlling and providing an initial exciting current path for said field coil.

2. A semiconductor voltage regulator as in claim 1 wherein: said control circuit is activated by an output of said auxiliary rectifying circuit and is operatively connected in parallel with said field control transistor circuit means to said field coil.

3. A semiconductor voltage regulator as in claim 2, wherein a diode for preventing reverse current is inserted in said control circuit means for controlling the charge indication lamp and initially exciting the field winding.

4. A semiconductor voltage regulator as in claim 1 wherein said field control transistor circuit means further comprises:
   a diode connected between a Zener diode and a storage battery with a polarity such that current is permitted to flow from the battery to said Zener diode.

5. A semiconductor voltage regulator as in claim 4, wherein a resistor is inserted between said Zener diode and the output end of said full-wave rectifying circuit, thereby providing an electrical current from the AC generator to the field current control transistor circuit in the event of disconnection of the circuit between said Zener diode and said battery.

6. A semiconductor voltage regulator as in claim 5, wherein a diode for preventing a reverse current is inserted in said control circuit means for controlling a charge indication lamp and initially exciting the field winding.

7. A semiconductor voltage regulator as in claim 4, wherein a diode for preventing a reverse current is inserted in said control circuit means for controlling a charge indication lamp and initially exciting the field winding.

8. A semiconductor voltage regulator as in claim 1 wherein:
   a resistor is connected between a Zener diode in said field control circuit and said output end of said full-wave rectifying circuit to provide an electrical voltage from said generator to said regulator even if a circuit between said regulator and said battery is disconnected.

9. A semiconductor voltage regulator as in claim 8, wherein a diode for preventing reverse current is inserted in said control circuit means for controlling a charge indication lamp and initially exciting the field winding.

10. A semiconductor voltage regulator as in claim 1, wherein there is further provided a safety transistor circuit as part of said field control circuit and connected to an output of said rectifying circuit for turning said field control circuit off until the charge of said battery is commenced thereby preventing possible burnout of said field control circuit.